Patented May 26, 1931

1,807,060

UNITED STATES PATENT OFFICE

WALTER CLAYPOOLE, OF FOREST HILLS, NEW YORK, ASSIGNOR TO THE TEXAS COMPANY, OF NEW YORK, N. Y., A CORPORATION OF DELAWARE

CABLE OIL

No Drawing.   Application filed April 18, 1929. Serial No. 356,315.

This invention relates to oils which are suitable for use as electrical insulating media and deals particularly with an oil which may be used for saturating high tension, paper-wound electric cables.

Mineral oils containing dissolved rosin have been used as cable saturating oils for many years. Such oils have the disadvantage, however, of a low resistivity and also a relatively high power factor loss. More recently, there has been suggested the use of rubber in small percentages dissolved in mineral oil to give a cable saturating oil having a much higher resistivity.

I have found that by blending both rosin and rubber in mineral oil a cable saturating oil having exceptional electrical values can be produced.

In preparing such oils I may introduce the rubber into the oil in the form of rubber latex. The oil may be mixed with the selected proportion of rubber latex and heated to above the boiling point of water, preferably while introducing carbon dioxide gas to furnish agitation and prevent oxidation of the oil mixture, until all water is removed. The rosin may then be dissolved in the hot mixture.

The following tables indicate respectively the values found for resistivity and power factor loss of the mineral oil alone, the oil blended with rosin, the oil blended with rubber, and the oil blended with both rosin and rubber:

TABLE I

Resistivities at 100° C. ohms per cubic centimeter of blends of mineral oil, pale rosin and rubber from rubber latex

| Description of oil tested | Resistivity |
|---|---|
| Mineral oil | 95 × 10¹⁰ |
| Mineral oil + 10% rosin | 65 × 10¹⁰ |
| Mineral oil + 15% rosin | 95 × 10¹ |
| Mineral oil + ¼% rubber | 215 × 10¹ |
| Mineral oil + ½% rubber | 540 × 10 |
| Mineral oil + 10% rosin + ¼% rubber | 260 × 10¹⁰ |
| Mineral oil + 15% rosin + ¼% rubber | 295 × 10¹⁰ |
| Mineral oil + 10% rosin + ½% rubber | 285 × 10¹⁰ |
| Mineral oil + 15% rosin + ½% rubber | 270 × 10¹⁰ |

TABLE II

Percentage power factor loss at 120° C. of blends of mineral oil, pale rosin, and rubber from rubber latex

| Description of oil tested | Power factor loss |
|---|---|
| | Per cent |
| Mineral oil | 0.40 |
| Mineral oil + 10% rosin | 0.31 |
| Mineral oil + 15% rosin | 0.24 |
| Mineral oil + ¼% rubber | 0.31 |
| Mineral oil + ½% rubber | 0.30 |
| Mineral oil + 10% rosin + ¼% rubber | 0.24 |
| Mineral oil + 15% rosin + ¼% rubber | 0.21 |
| Mineral oil + 10% rosin + ½% rubber | 0.25 |
| Mineral oil + 15% rosin + ½% rubber | 0.33 |

From an examination of Table I it will be observed that rosin alone blended with the mineral oil to the extent of 10% lowers the resistivity, while 15% of rosin merely holds the resistivity value to the same figure as that obtained for the oil alone. Most rosins actually serve to depress the resistivity readings and higher results were obtained in these tests because of the purity of the particular rosin employed. Rubber, of course, raises the resistivity markedly. However, in the blends of both rosin and rubber containing ¼% rubber, the property of the rosin to reduce the resistivity apparently is not exerted and unexpectedly high figures are obtained with these blends. The blends containing ½% of rubber also show high resistivity but do not show the same degree of increase over the value for the oil alone as do the values for the oil containing only rubber.

The blends of oil, rosin and rubber also show very low percentages of power factor loss as illustrated in Table II. The lowest loss occurs with the blend containing 15% of rosin and ¼% of rubber. This same blend also shows the highest resistivity of the oil-rosin-rubber blends and this proportion of ingredients is therefore especially effective.

The mineral oil used in the foregoing tests was a vacuum distilled oil from a Gulf Coastal crude having approximately the following tests:

| | |
|---|---|
| Gravity, A. P. I. | 18.9° |
| Flash | 450° F. |
| Fire | 515° F. |
| Viscosity universal at 210° F. | 91 sec. |
| Carbon residue | 0.20% |

It is to be understood, of course, that other suitably purified mineral oils may be used.

What I claim is:

1. A cable oil consisting essentially of a mineral hydrocarbon oil, rosin, and rubber, and having a resistivity of 250 to $300 \times 10^{10}$ ohms per cubic centimeter at 100° C.

2. A cable oil comprising about 85 to 90% of a mineral hydrocarbon oil, 10 to 15% of rosin, 0.5% or less of rubber, and having a resistivity of 250 to $300 \times 10^{10}$ ohms per cubic centimeter at 100° C.

3. A cable oil comprising about 85 to 90% of mineral oil, 10 to 15% of rosin, and 0.5% or less of rubber.

4. A cable oil comprising about 85% of mineral oil, about 15% of rosin, and about 0.25% of rubber.

In witness whereof I have hereunto set my hand and seal this 15th day of April, 1929.

WALTER CLAYPOOLE.